United States Patent
Lee

(10) Patent No.: US 12,019,836 B2
(45) Date of Patent: Jun. 25, 2024

(54) TOUCH SCREEN AND TOUCH SENSITIVE PROCESSING APPARATUS AND METHOD THEREOF

(71) Applicant: EGALAX_EMPIA TECHNOLOGY INC., Taipei (TW)

(72) Inventor: Cheng-Han Lee, Taipei (TW)

(73) Assignee: EGALAX EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/072,743

(22) Filed: Dec. 1, 2022

(65) Prior Publication Data
US 2023/0195269 A1    Jun. 22, 2023

Related U.S. Application Data

(60) Provisional application No. 63/292,436, filed on Dec. 22, 2021.

(51) Int. Cl.
*G06F 3/041*    (2006.01)
*G06F 3/044*    (2006.01)

(52) U.S. Cl.
CPC .......... *G06F 3/0446* (2019.05); *G06F 3/0416* (2013.01); *G06F 3/0448* (2019.05); *G06F 2203/04106* (2013.01); *G06F 2203/04111* (2013.01)

(58) Field of Classification Search
CPC .... G06F 3/0446; G06F 3/0416; G06F 3/0448; G06F 2203/04106; G06F 2203/04111; G06F 3/04166; G06F 3/0443; G06F 3/0445
See application file for complete search history.

(56) References Cited

U.S. PATENT DOCUMENTS

| | | | |
|---|---|---|---|
| 2015/0015538 A1* | 1/2015 | Tanaka ................... | G06F 3/0445 345/174 |
| 2015/0193047 A1* | 7/2015 | Hoshtanar ............. | G06F 3/0446 345/174 |
| 2017/0141458 A1* | 5/2017 | Kwon .................... | G06F 1/1635 |
| 2017/0160850 A1* | 6/2017 | Cao ........................ | G06F 3/0412 |
| 2018/0121016 A1* | 5/2018 | Yeh ........................ | G06F 3/04166 |
| 2018/0329539 A1* | 11/2018 | Chang ................... | G06F 3/04186 |
| 2019/0155451 A1* | 5/2019 | Yeh ........................ | G06F 3/0443 |
| 2020/0142542 A1* | 5/2020 | Kuriki ................... | G06F 3/0445 |

\* cited by examiner

*Primary Examiner* — Temesghen Ghebretinsae
*Assistant Examiner* — Sosina Abebe
(74) *Attorney, Agent, or Firm* — WPAT, PC

(57) ABSTRACT

A touch screen which is provided comprising: a display; multiple first electrodes in parallel to a first axis and multiple second electrodes in parallel to a second axis, wherein the first and the second electrodes are overlapped with the display; and an opaque and non-conductive frame which surrounds and overlaps on top of edges of the display, wherein the first axis is perpendicular to the second axis, the first electrodes intersect with the second electrodes, a distance between center lines of any two adjacent second electrodes is a second pitch, a distance in the first axis between a center line of the first one of the second electrodes and a second edge of the frame in parallel to the second axis is less than or equals to a quarter of the second pitch, a distance in the first axis between a center line of the last one of the second electrodes and a fourth edge of the frame in parallel to the second axis is less than or equals to a quarter of the second pitch.

10 Claims, 10 Drawing Sheets

TOUCH SCREEN AND TOUCH SENSITIVE PROCESSING APPARATUS AND METHOD THEREOF

CROSS REFERENCE TO RELATED PATENT APPLICATION

This patent application is based on a provisional patent application No. 63/292,436 filed on Dec. 22, 2021.

FIELD OF THE INVENTION

The present invention relates to touch sensitive area, and more particularly, to arrangements of touch electrodes of touch screen.

BACKGROUND OF THE INVENTION

Touch screen includes multiple touch electrodes. Each of the touch electrodes connects to a touch sensitive processing apparatus. The touch sensitive processing apparatus may detect external objects such as fingers or styli which are hovering or touching the touch screen by utilizing capacitance sensing principles.

Please refer to FIG. 1, which depicts a top view of a touch screen 100. The touch screen 130 includes a frame. A display screen is inside in the frame 130. The display screen is also a touch sensitive area which touch electrodes disposed. The frame 130 may be made by dielectric materials for protecting edges of the display screen and for accommodating circuit buses between touch electrodes and a touch sensitive processing apparatus.

There is a circle of a peripheral area 120 around the frame 130. A normal area 110 is inside the peripheral area 120. Because of arrangements of touch electrodes, a density of touch electrodes in the peripheral area 120 is lower than a density of touch electrodes in the normal area 110. When meeting same external object touching situation, capacitance changes in the peripheral area 120 would be fewer. This leads to downgrade of sensing accuracy in the peripheral area 120 by the touch sensitive processing apparatus.

For example, in the guidelines for Windows Hardware Developer provided by Microsoft company (https://docs.microsoft.com/en-us/windows-hardware/design/component-guidelines/touchscreen-tests), with regard to test standard of touch accuracy, it defines that the peripheral area 120 is an area with internal edges of the frame in 3.5 mm. In this peripheral area 120, error of touch position is 2.0 mm plus or minus, and error of touch position in the normal area 110 is 1.0 mm plus or minus.

When an external object hovering on top of the touch screen, it causes less capacitance changes to the touch electrodes comparing to the external object touching the touch screen. Thus, errors in detecting hovering objects in the peripheral area 120 are larger than errors in detecting touching objects.

Please refer to FIG. 2, which illustrates a top view of a lower left corner of an existing touch screen 100. The touch screen 100 includes two kinds of touch electrodes. The first kind is horizontal first electrodes 210 in black. The second kind is vertical second electrodes 220 in while. The first electrodes 210 and the second electrodes 220 may be disposed in different electrode layers or in one electrode layer. Each of the touch electrodes includes multiple diamond shape plates which are connected by wires. When the first electrodes 210 and the second electrodes 220 are disposed in the same electrode layer, the wires between the diamond shape plates are made in a form of bridge to prevent contacts between the first electrodes 210 and the second electrodes 220.

A pitch between each two of the second electrodes 220 is fixed. A edge pitch between the first one of the second electrodes 220 and the frame is different from the pitch. When an external object hovering or touching around the first one of the second electrodes 220, it causes few capacitance changes to rest of the second electrodes 220. Thus, it leads to a larger error.

Hence, it is desired to improve designs of touch electrodes such that the detecting errors with regard to hovering or touching objects in the peripheral area.

SUMMARY OF THE INVENTION

According to one embodiment of the present application, a touch screen which is provided comprising: a display; multiple first electrodes in parallel to a first axis and multiple second electrodes in parallel to a second axis, wherein the first and the second electrodes are overlapped with the display; and an opaque and non-conductive frame which surrounds and overlaps on top of edges of the display, wherein the first axis is perpendicular to the second axis, the first electrodes intersect with the second electrodes, a distance between center lines of any two adjacent second electrodes is a second pitch, a distance in the first axis between a center line of the first one of the second electrodes and a second edge of the frame in parallel to the second axis is less than or equals to a quarter of the second pitch, a distance in the first axis between a center line of the last one of the second electrodes and a fourth edge of the frame in parallel to the second axis is less than or equals to a quarter of the second pitch.

Preferably, in order to fit the touch electrodes into a double layer structure, wherein the first electrodes and the second electrodes are deposited in different layers, wherein each of the first electrodes are rectangular and each of the second electrodes are rectangular.

Preferably, in order to fit the touch electrodes into a single layer structure, wherein the first and the second electrodes are deposited into a same layer, each of the first electrodes comprises multiple connected first rectangular conductive plates, each of the second electrodes comprises multiple connected second rectangular conductive plates, the first or the second rectangular conductive plates are connected by bridging.

Preferably, in order to increase detectability in the peripheral area of the touch screen, wherein the distance in the first axis between the center line of the first one of the second electrodes and the second edge of the frame in parallel to the second axis is less than or equals to a half width of the second electrode, the distance in the first axis between the center line of the last one of the second electrodes and the fourth edge of the frame in parallel to the second axis is less than or equals to a half width of the second electrode.

Preferably, in order to increase detectability in the peripheral area of the touch screen, wherein the first and the last second electrodes are deposited in between the frame and the display.

Preferably, in order to increase detectability in the peripheral area of the touch screen, wherein a distance between center lines of any two adjacent first electrodes is a first pitch, a distance in the second axis between a center line of the first one of the first electrodes and a first edge of the frame in parallel to the first axis is less than or equals to a quarter of the first pitch, a distance in the second axis between a center line of the last one of the first electrodes and a third edge of the frame in parallel to the first axis is less than or equals to a quarter of the first pitch.

Preferably, in order to increase detectability in the peripheral area of the touch screen, wherein the distance in the second axis between the center line of the first one of the first electrodes and the first edge of the frame in parallel to the first axis is less than or equals to a half width of the first electrode, the distance in the second axis between the center line of the last one of the first electrodes and the third edge of the frame in parallel to the first axis is less than or equals to a half width of the first electrode.

Preferably, in order to increase detectability in the peripheral area of the touch screen, wherein the first and the last first electrodes are deposited in between the frame and the display.

Preferably, in order to design conveniently, a width of the first electrode is identical to a width of the second electrode.

Preferably, in order to adopt to fingertip size of normal people, wherein the second pitch is 10 mm, a width of the second electrode is 2 mm.

According to an embodiment of the present application, a touch sensitive processing apparatus is provided for controlling the touch screen, wherein there are N+2 second electrodes, where N is a natural number larger than 2, wherein the touch sensitive processing apparatus comprising: a driving circuit for providing driving signal to the multiple first electrodes in turns; a sensing circuit, including N+1 difference value circuits, wherein while the driving signal is being provided by the driving circuit, each of the difference value circuits is configured for sensing the induced driving signal of two adjacent second electrodes in order to generate a one-dimensional first sensing array with N+1 elements; and a processor module, connecting to the driving circuit and the sensing circuit, configured for receiving multiple of the one-dimensional first sensing arrays in turns to form a two-dimensional first sensing array; and detecting external objects approximating or touching the touch screen according to the second-dimensional first sensing array.

Preferably, in order to alleviating electromagnetic interference around the frame, wherein the processor module is further configured for: removing the first and the last elements of the multiple one-dimensional first sensing arrays to generate multiple two-dimensional second sensing arrays, respectively; forming a two-dimensional second sensing array based on the multiple two-dimensional second sensing arrays; and detecting external objects approximating or touching the touch screen according to the two-dimensional second sensing array.

Preferably, in order to detect external objects moving from the frame into the touch screen, when in a first mode, the touch sensitive processing apparatus is further configured for reporting the external objects detected according to the two-dimensional first sensing array to a host, wherein the first mode is corresponding to detecting the external objects moving from the frame into the display.

Preferably, in order to detect external objects hovering or touching a non-peripheral area of the touch screen, wherein in a second mode, the touch sensitive processing is further configured for reporting the external objected detected according to the two-dimensional second sensing array to a host, wherein the second mode is corresponding to detecting the external objects hovering or touching the touch screen in a non-peripheral area.

Preferably, in order to deal with a phenomenon of electromagnetic interference to the peripheral area of the touch screen, wherein gains of the first and the last of the difference value circuits are different to gains of rest of the difference value circuits.

According to an embodiment of the present application, a touch sensitive processing method is provided for controlling the touch screen, wherein there are N+2 second electrodes, where N is a natural number larger than 2, wherein the touch sensitive processing method comprising: providing driving signal to the multiple first electrodes in turns; while the driving signal is being provided by the driving circuit, sensing, by each of N+1 difference value circuits, the induced driving signal of two adjacent second electrodes in order to generate a one-dimensional first sensing array with N+1 elements; receiving multiple of the one-dimensional first sensing arrays in turns to form a two-dimensional first sensing array; and detecting external objects approximating or touching the touch screen according to the second-dimensional first sensing array.

Preferably, in order to alleviating electromagnetic interference around the frame, wherein the touch sensitive processing method further comprises: removing the first and the last elements of the multiple second sensing arrays, respectively; forming a two-dimensional second sensing array based on the multiple two-dimensional second sensing arrays; and detecting external objects approximating or touching the touch screen according to the two-dimensional second sensing array.

Preferably, in order to detect external objects moving from the frame into the touch screen, wherein the touch sensitive processing method further comprises: when in a first mode, reporting the external objects detected according to the two-dimensional first sensing array to a host, wherein the first mode is corresponding to detecting the external objects moving from the frame into the display.

Preferably, in order to detect external objects hovering or touching a non-peripheral area of the touch screen, wherein the touch sensitive processing method further comprises: wherein in a second mode, reporting the external objected detected according to the two-dimensional second sensing array to a host, wherein the second mode is corresponding to detecting the external objects hovering or touching the touch screen in a non-peripheral area.

Preferably, in order to deal with a phenomenon of electromagnetic interference to the peripheral area of the touch screen, wherein gains of the first and the last of the difference value circuits are different to gains of rest of the difference value circuits.

According to an embodiment of the present application, a touch system provided comprising the touch sensitive processing apparatus and the According to an embodiment of the present application, a touch system provided comprising the touch sensitive processing apparatus, the touch screen and the host.

The present application provides design improvements of touch electrodes in the peripheral area of the touch screen which can reduce errors of detecting external object hovering or touching the peripheral area of the touch screen. The present application further provides touch sensitive processing apparatus and method thereof, which reduce electromagnetic interferences to the peripheral area of the touch screen by using difference value circuits.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
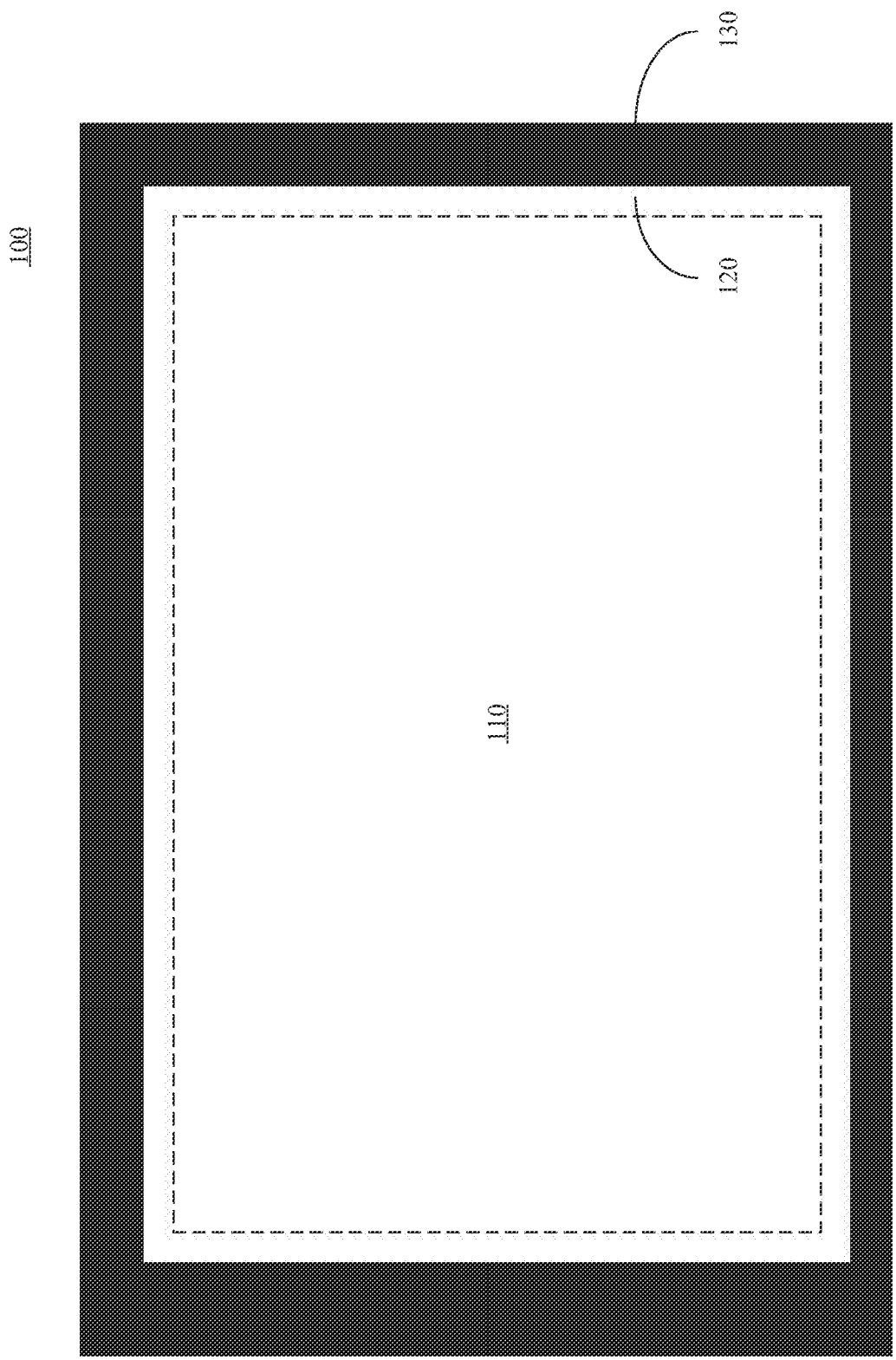
FIG. 1 depicts a top view of a touch screen 100. The touch screen 130 includes a frame.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Figure 3:
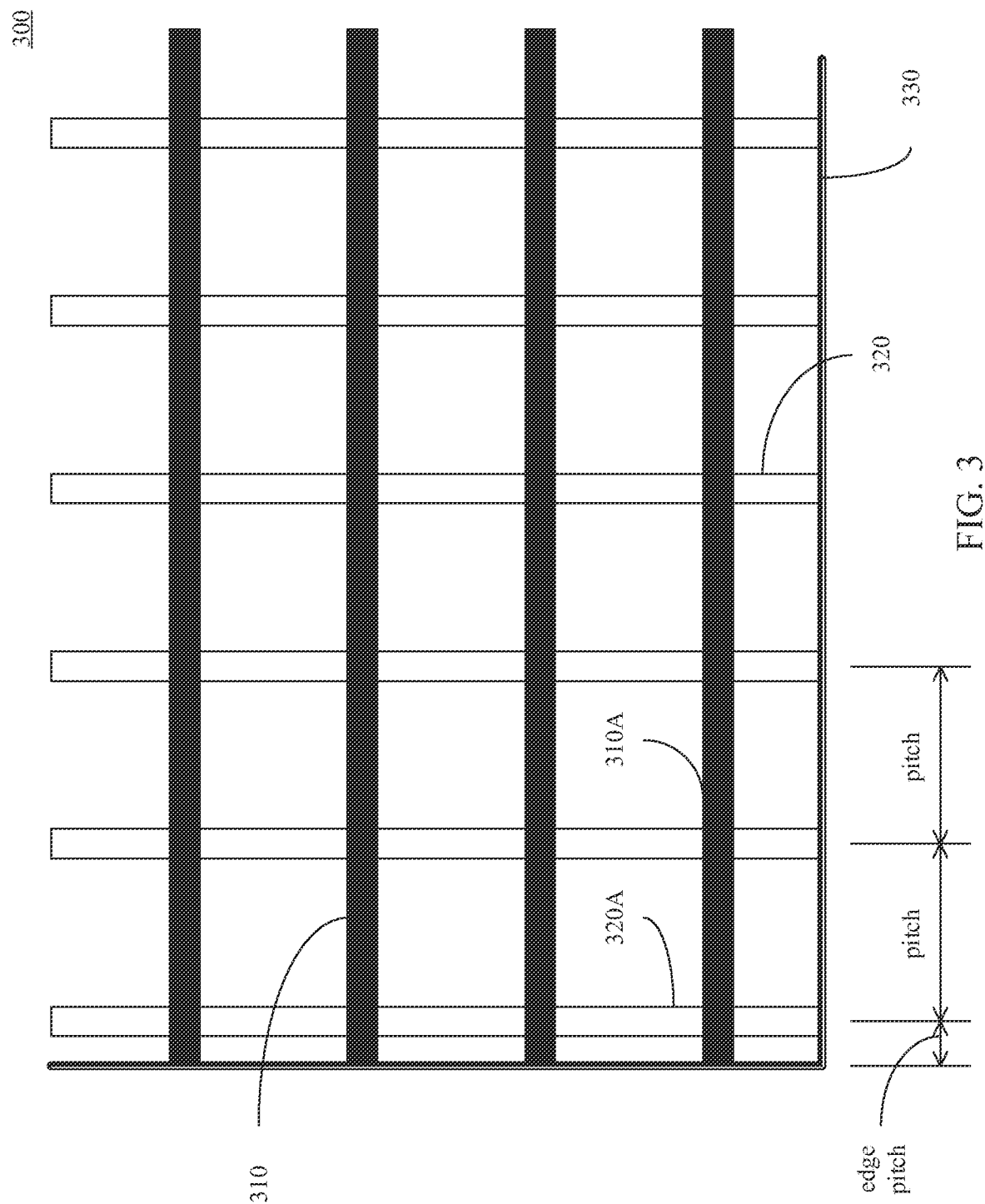
FIG. 3 illustrates a top view of a lower left corner of a touch screen 300 in accordance with an embodiment of the present application.

Please refer to FIG. 3, which illustrates a top view of a lower left corner of a touch screen 300 in accordance with an embodiment of the present application. The touch screen 300 may include multiple elongated first electrodes 310 and multiple elongated second electrodes 320. The first electrodes 310 and the second electrodes 320 may be disposed in different electrode layers. Although the first electrodes 310 are on top of the second electrodes 320 as shown in FIG. 3, the present application does not limit which one of the first and the second electrodes is above on another. A pitch between any two of the second electrodes 320 may be identical. The pitch is defined as a distance between central lines of two adjacent second electrodes. The first electrodes 310 and the second electrodes 320 may be made by transparent conductive materials such that underlying display screen can be seen. The transparent conductive materials may include ITO (Indium Tin Oxide). The frame 330 is disposed on top of the electrode layers including the first electrodes 310 and the second electrodes 320.

When implementing mutual-capacitance sensing, driving signals are emitted from one of the first electrodes 310 and induced driving signals of the second electrodes 320 are sensed to form a one-dimensional sensing array. After the driving signals are emitted from all of the first electrodes 310 in turns and multiple one-dimensional sensing arrays are gathered. A two-dimensional sensing arrays can be formed according to the multiple one-dimensional sensing arrays. Based on the two-dimensional sensing array, external objects hovering or touching the touch screen 300 can be detected.

Because the 1st second electrode 320A is elongated, i.e., it does not include conductive plates of the first one of the second electrodes 220A, the 1st second electrode 320A can be disposed closer to the frame 330. Hence the second, the third, and the rest of the second electrodes 330 are closer to the frame 330. Since an edge pitch between the 1st second electrode 320A and the frame 330 is narrower, the peripheral area 120 is decreased accordingly. From another angle of view, the detecting errors in the peripheral area 120 may be decreased and the detecting accuracy is elevated.

Figure 2:
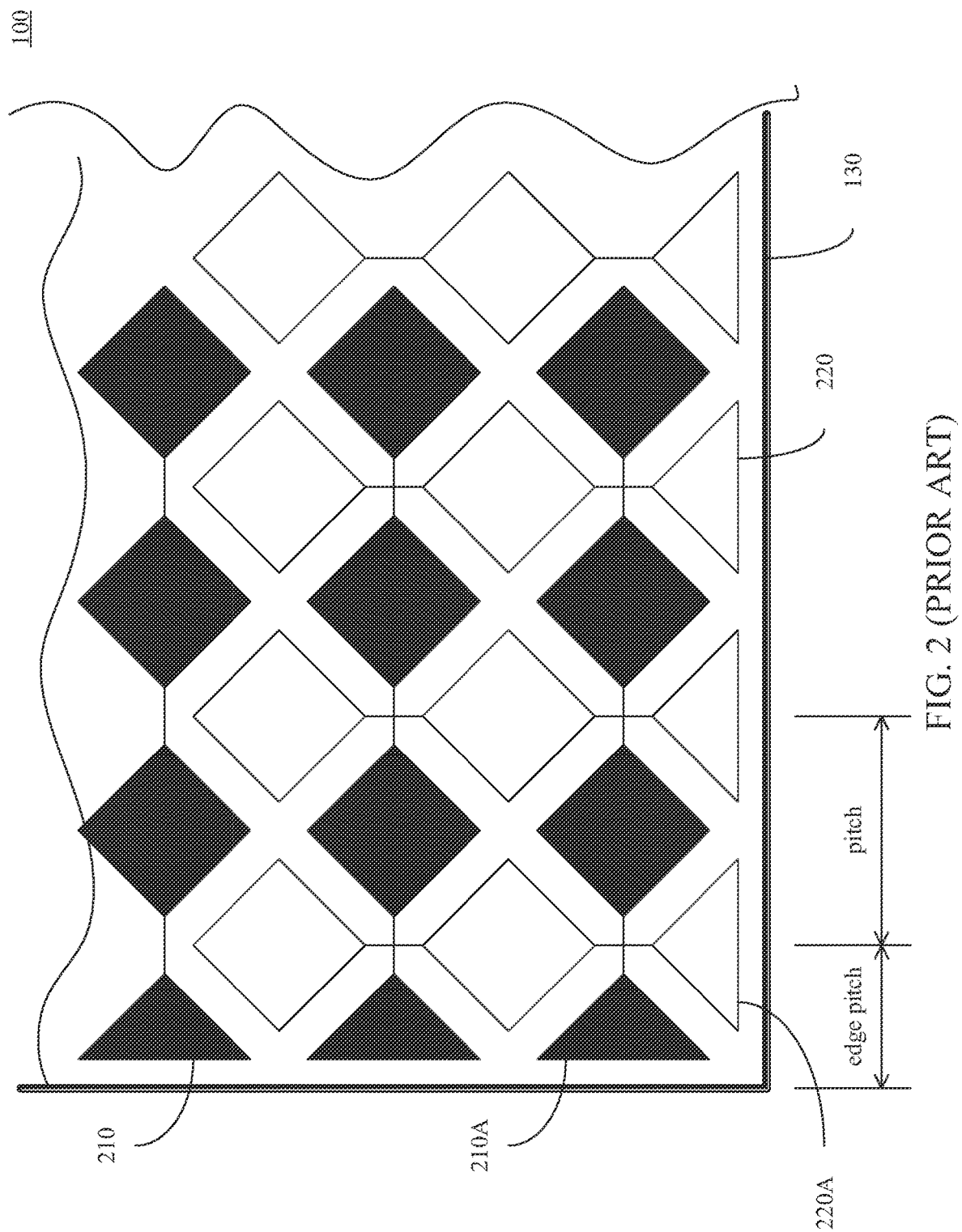
FIG. 2 illustrates a top view of a lower left corner of an existing touch screen 100.

From the viewpoint of manufacture, comparing to the embodiment as shown in FIG. 3, the touch electrodes as shown in FIG. 2 have more complicated shapes. Thus, errors in manufacture processes are more prone. Especially in cases that the touch electrodes are disposed in the same electrode layer, bridging circuits are necessitated, so manufacture defect rate is higher. Consequently, the embodiment as shown in FIG. 3 has benefits of less manufacture defects, higher yield rate and lower costs.

From the viewpoint of manufacture materials, comparing to the embodiment as shown in FIG. 3, the touch electrodes as shown in FIG. 2 comprise conductive plates in larger area, i.e., more electrode materials are required. Hence, the embodiment as shown in FIG. 3 has benefits of lower costs of manufacture materials.

Figure 4:
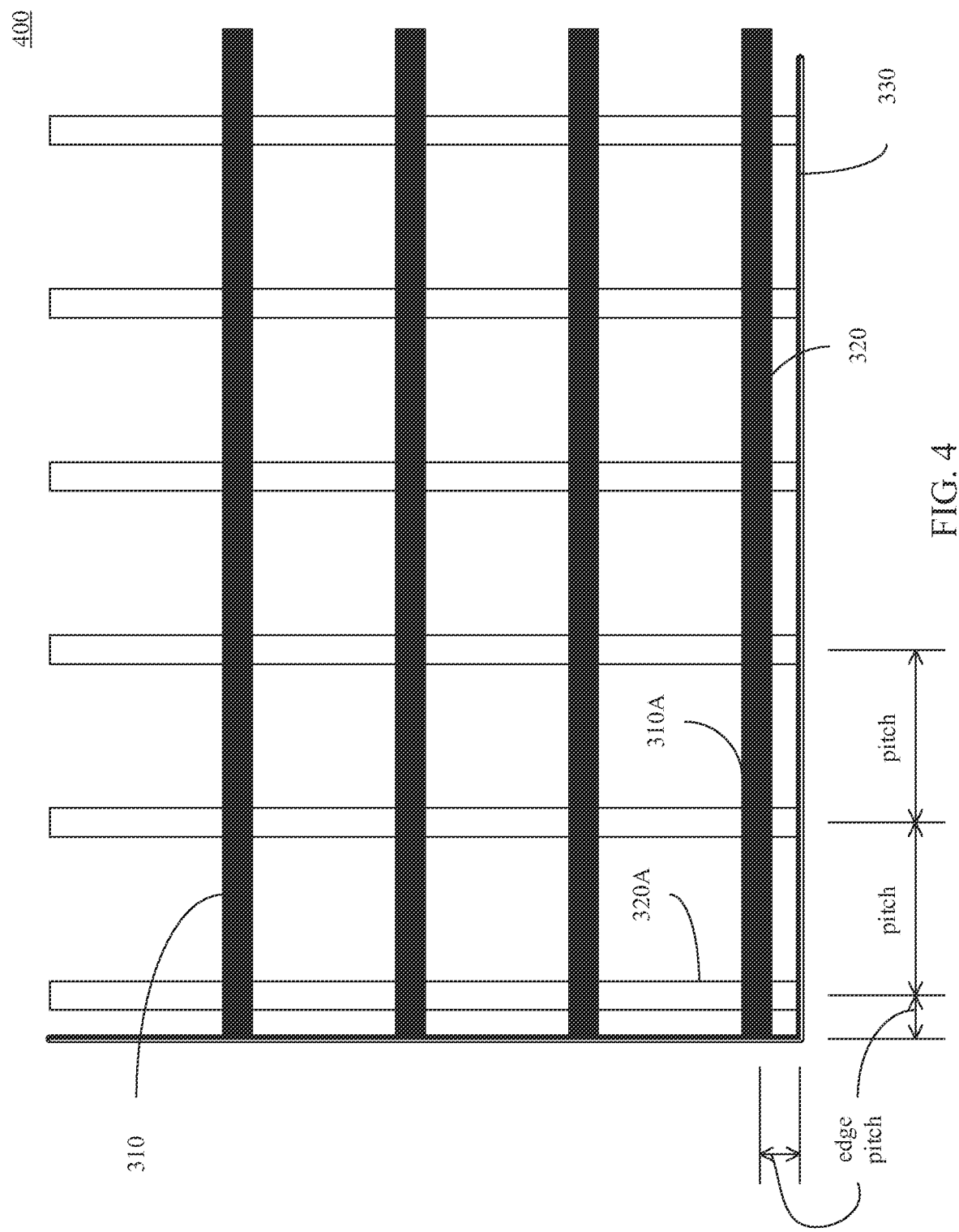
FIG. 4 depicts a top view of a lower left corner of a touch screen 400 in accordance with an embodiment of the present application.

Please refer to FIG. 4, which depicts a top view of a lower left corner of a touch screen 400 in accordance with an embodiment of the present application. Comparing to the touch screen 300, an edge pitch between the $1^{st}$ second electrode 310A and the frame 330 is also decreased. When detecting a hovering stylus, a touch sensitive processing apparatus is supposed to receive driving signals emitted by the stylus. When the edge pitch between the $1^{st}$ first electrode 310A and the frame 330 is decreased, it also decreases errors of stylus detecting in the upper and the lower edges of the peripheral area. Person having ordinary skill in the art can understand that the description corresponding to the 1st second electrode 320A may be also applicable to the $1^{st}$ first electrode 310A.

The first pitch between the first electrodes 310 may not equal to the second pitch between the second electrodes. A first edge pitch between the $1^{st}$ first electrode 310A and the frame 330 may not equal to a second edge pitch between the $1^{st}$ second electrode 320A and the frame 330.

In one embodiment, a first edge pitch between the $1^{st}$ first electrode 310A and a lower edge of the frame 330 may equal to a first edge pitch between the last first electrode 310 and an upper edge of the frame 330. A second edge pitch between the 1st second electrode 320A and a left edge of the frame 330 may equal to a second edge pitch between the last second electrode 320 and a right edge of the frame 330.

Figure 5C:
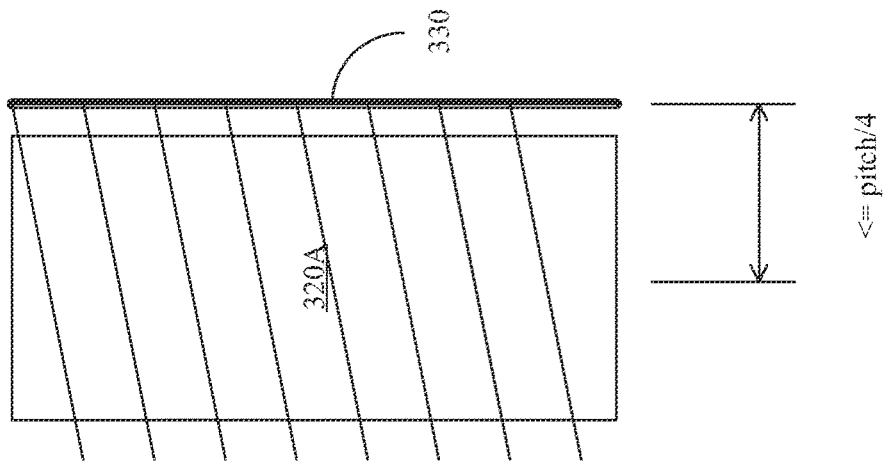
FIG. 5C is a diagram illustrates an edge pitch according to an embodiment of the present application.
Figure 5B:
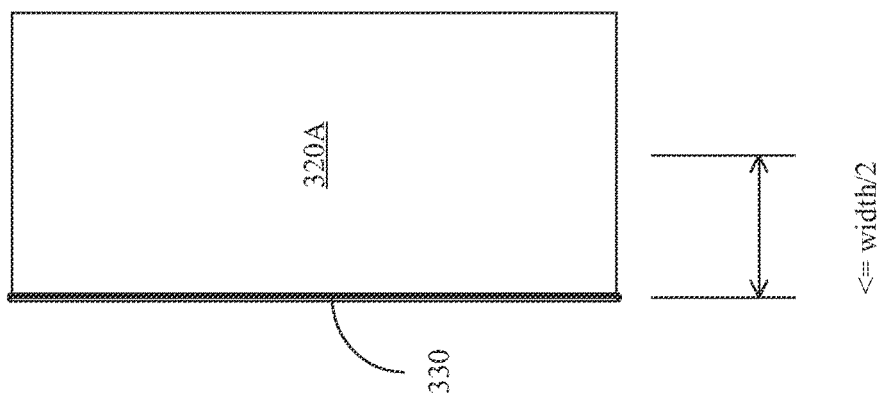
FIG. 5B is a diagram illustrates an edge pitch according to an embodiment of the present application.
Figure 5A:
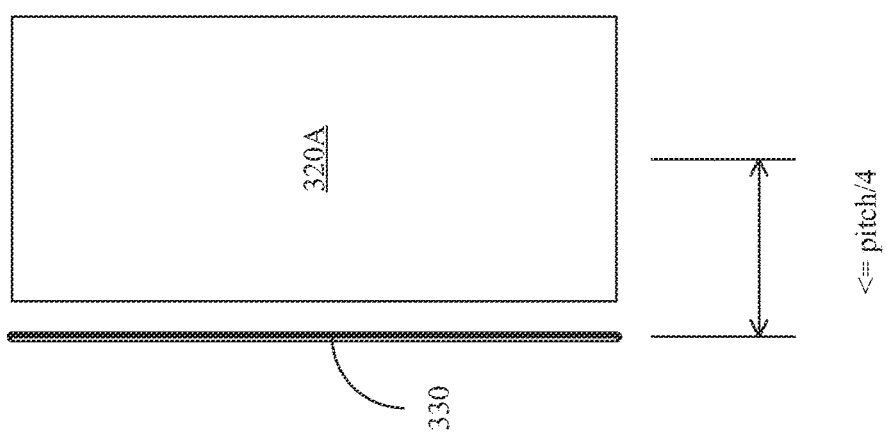
FIG. 5A is a diagram illustrates an edge pitch according to an embodiment of the present application.

Please refer to FIG. 5A, which is a diagram illustrates an edge pitch according to an embodiment of the present application. In this embodiment, an edge pitch between a central line of the $1^{st}$ second electrode 320A and a left edge of the frame 330 equals to or is less than a quarter of a pitch between two of the second electrodes 320.

For examples, in case a pitch between the second electrodes 320 is 10 mm and a width of the second electrode 320 is 2 mm, the edge pitch would be less than 2.5 mm in the embodiment as shown in FIG. 5A. A distance between a right edge of the 1 st second electrode 320 and a left edge of the frame 330 would be less than 3.5 mm which is smaller than the 3.5 mm range of peripheral area 120 defined by Microsoft.

In other words, in an embodiment, the whole $1^{st}$ of the second electrodes 320 and the whole last of the second electrodes 320 are disposed in the peripheral area 120 as shown in FIG. 1, rather than in the normal area 110.

Please refer to FIG. 5B, which is a diagram illustrates an edge pitch according to an embodiment of the present application. In this embodiment, an edge pitch between a central line of the $1^{st}$ second electrode 320A and a left edge of the frame 330 equals to or is less than a half of a width of the second electrode 320. That is the frame may be at the left side of the central line of the $1^{st}$ second electrode 320A. In one embodiment, the frame 330 may cover a half or less of the $1^{st}$ and the last of the second electrodes 320. The $1^{st}$ and the last of the second electrodes 320 may be still exposed to a touchable area of an external object.

Please refer to FIG. 5C, which is a diagram illustrates an edge pitch according to an embodiment of the present application. In this embodiment, a edge pitch between a central line of the $1^{st}$ second electrode 320A and a left edge of the frame 330 equals to or is less than a quarter of a pitch between the second electrodes 320. However, the frame 330 fully covers the $1^{st}$ second electrode 320A. This may be interpreted as that the frame 330 covers a partial or a whole peripheral area 120 such that the rest of exposed touch sensitive area is viewed as the normal area 110.

Figure 6:
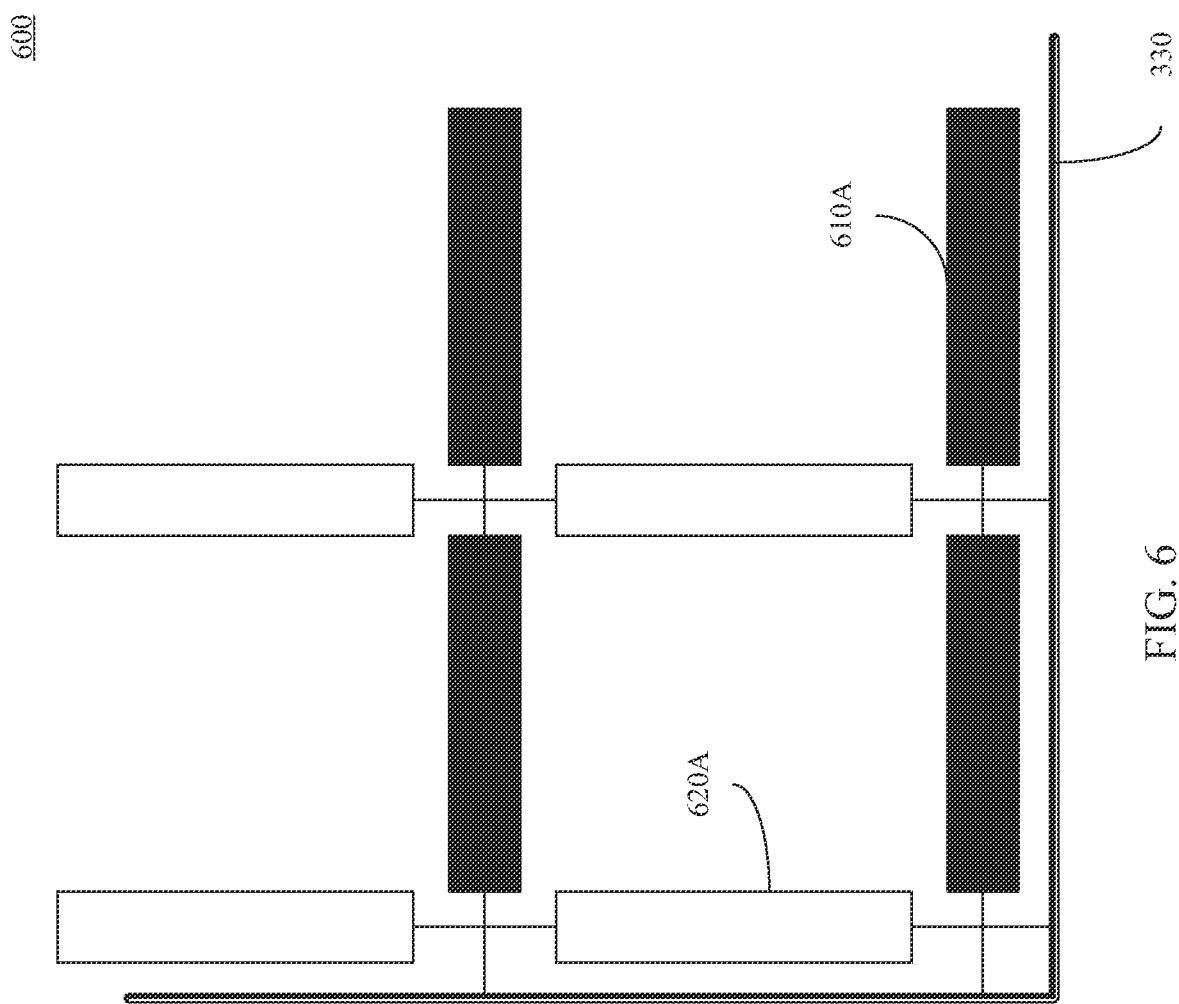
FIG. 6 illustrates a top view of a lower left corner of a touch screen 600 according to an embodiment of the present application.

Please refer to FIG. 6, which illustrates a top view of a lower left corner of a touch screen 600 according to an embodiment of the present application. In the embodiments as shown in FIGS. 3 and 4, the first electrodes 310 and the second electrodes 320 are disposed in different electrode layers. However, in the embodiment as shown in FIG. 6, the first electrodes 610 and the second electrodes 620 are disposed in the same electrode layer. Each touch electrode comprises multiple elongated conductive plates. Wires are used to bridge the conductive plates to prevent the first electrodes 610 are in contact with the second electrodes 620.

Figure 7:
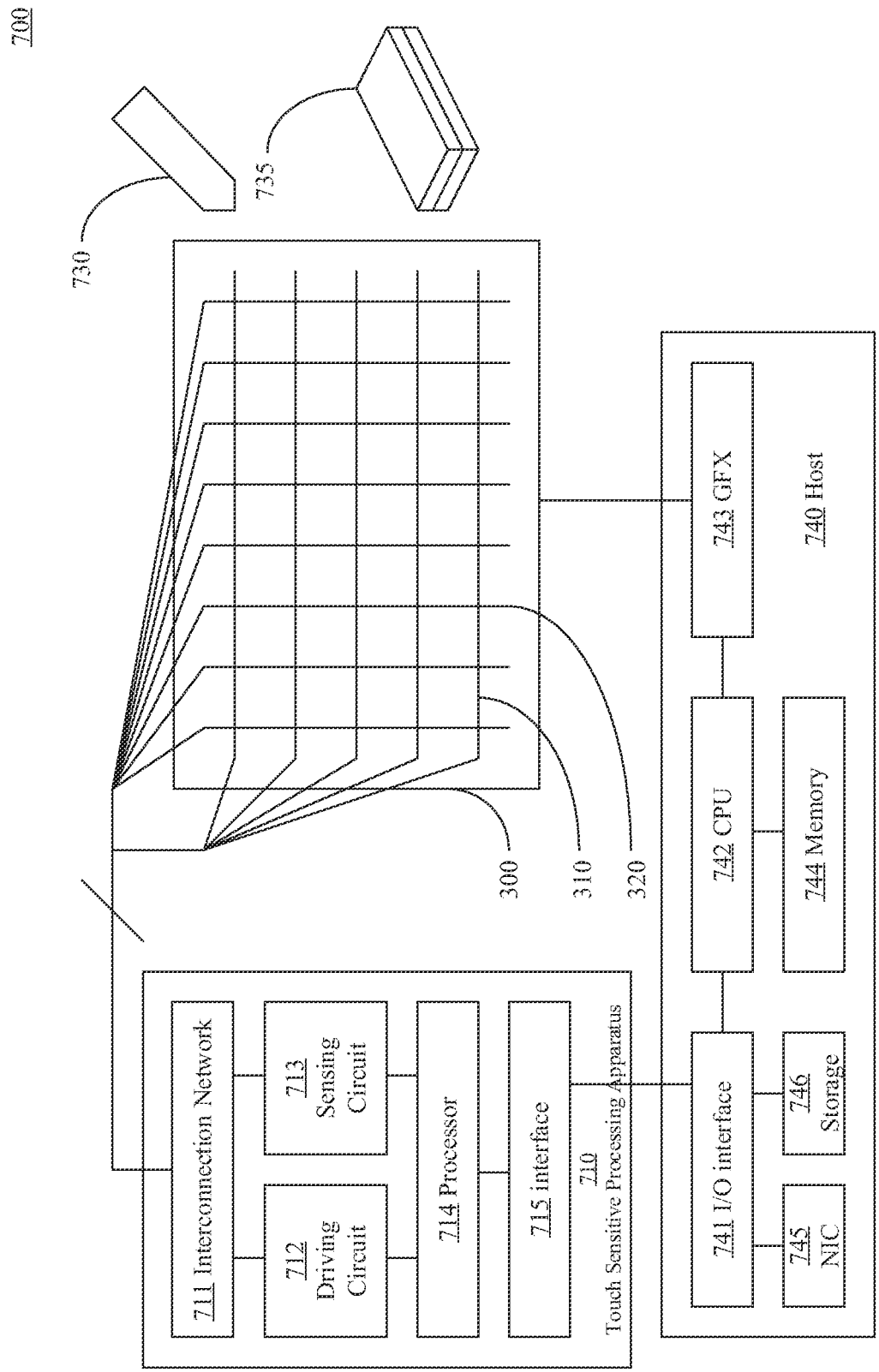
FIG. 7 shows a block diagram of a touch system 700 according to an embodiment of the present invention.

Please refer to FIG. 7, which shows a block diagram of a touch system 700 according to an embodiment of the present invention. The touch system 700 may be a computer system such as a desktop computer, a laptop computer, a tablet computer, an industrial control computer, a smartphone or any other kinds of computer having touch sensitive function.

The touch system 700 may comprise a touch sensitive processing apparatus 710, a touch panel or screen 300, 400 or 600 coupled to the touch sensitive processing apparatus, and a host 740 coupled to the touch sensitive processing apparatus. The touch system 100 may further comprises one or more styli 730 and/or touch board eraser 735. Hereinafter the touch panel or screen 300 is referred as the touch screen 300. However, in the embodiments lacking of display function, persons having ordinary skill in the art can understand the touch screen denoted in the present application may be referred to a touch panel.

The touch screen 300 may comprise multiple first electrodes 310 in parallel to a first axis and multiple second electrodes 320 in parallel to a second axis. The first electrodes 310 may intersect with the second electrodes 320 in order to form multiple sensing points or sensing areas. Equivalently, the second electrodes 310 may intersect with the first electrodes 320 in order to form multiple sensing points or sensing areas. In some embodiments of the present application, the first electrodes 310 may be referred as first touch electrodes 310 and the second electrodes 320 may be referred as second touch electrodes 320. The first electrodes 310 and the second electrodes 320 may be collectively referred as touch electrodes. In some embodiments with touch screens 300, 400 or 600, the first electrodes 310 and the second electrodes 320 are made by transparent material. When applicable to the touch screen 600 of the embodiment as shown in FIG. 6, The first electrodes 610 and the second electrodes 620 may be disposed in one electrode layer. Conductive plates of each one of the first electrodes 610 or the second electrodes 620 may be connected by bridging. The first electrodes 310 and the second electrodes 320 may be disposed at different overlapping electrode layers. Unless described specifically, the present application may be applied to the embodiments having one or more electrode layers. The first axis and the second axis are perpendicular in most cases. However, the present application does not limit that the first axis and the second axis are perpendicular. In one embodiment, the first axis may be a horizontal axis or a pixel refreshing axis of the touch screen 300, 400 and 600.

The touch sensitive processing apparatus 710 may comprise following hardware circuit: an interconnection network module 711, a driving circuit module 712, a sensing circuit module 713, a processor module 714, and an interface module 715. The touch sensitive processing apparatus 710 may be implemented inside a single integrated circuit which may include one or more chips. It may use multiple integrated circuits and an interconnected circuit board carried the multiple integrated circuits to realize the touch sensitive processing apparatus 710. The touch sensitive processing apparatus 710 may be implemented in single integrated circuits with the host 740. The present application does not limit how to implement the touch sensitive processing apparatus 710.

The interconnection network module 711 is configured to connect each of the multiple first electrodes 310 and/or the multiple second electrodes 320 of the touch screen 300. The interconnection network module 711 may follow control command of the processor module 714 for connecting the driving circuit module 310 and any one or more touch electrodes and for connecting the sensing circuit module 713 and any one or more touch electrodes. The interconnection network module 711 may include a combination of one or more multiplexers (MUX) to realize the aforementioned functions.

The driving circuit module 712 may comprise clock generator, frequency divider, frequency multiplier, phase lock loop, power amplifier, DC-DC voltage converter, regulator and/or filter, which is configured to provide driving signal to any one or more touch electrodes via the interconnection network module 711 according to control commands of the processor module 714. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 712 may include one or more channel. Each channel may be connected to any one or more touch electrodes via the interconnection network module 711.

The sensing circuit module 713 may comprise integrator, sampler, clock generator, frequency divider, frequency multiplier, phase lock loop, power amplifier, operational amplifier, multiplier, DC-DC voltage converter, regulator and/or filter, which is configured to sense on any one or more touch electrodes via the interconnection network module 711 according to control commands of the processor module 714. When the touch signal is transmitted from one of the touch electrodes, another touch electrode may induce the touch signal. And the sensing circuit module 713 may demodulate the induced touch signal by the another touch electrode in accordance with the modulation method performed on the driving signal by the driving circuit module 712 in order to restore the messages carried by the driving signal. The sensing circuit module 713 may include one or more channels. Each channel may be connected to any one or more touch electrodes via the interconnection network module 711. At the same time, each channel may simultaneously perform sensing and demodulation.

In one embodiment, the driving circuit module 712 and the sensing circuit module 713 may include analog front-end (AFE) circuits. In another embodiment, in additional to the AFE circuits, the driving circuit module 712 and the sensing circuit module 713 may include digital back-end (DBE) circuits. If the driving circuit module 712 and the sensing circuit module 713 include only the AFE circuits, the DBE circuits may be implemented in the processor module 714.

The processor module 714 may include a digital signal processor for connecting the AFE circuits or the DBE circuits of the driving circuit module 712 and the sensing circuit module 713, respectively. The processor module 714 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 711, the driving circuit module 712, the sensing circuit module 713 and the interface module 715 of the touch sensitive processing apparatus 710. For examples, the processor 714 may comprises processors widely adopted in the industry such as 8051 series, Intel i960 series, ARM Cortex-M series and etc. The present application does not limit types and numbers of processor cores included in the processor module 714.

The instructions and data may be used to implement each of steps mentioned in the present application and flows and methods constructed by the steps. Some instructions may be executed independently inside the processor module 714, for examples, arithmetic and log operation instructions. Other instructions may be used to control other circuits of the touch sensitive processing apparatus 710. These instructions may include input/output interfaces of the processor module 714 to control other circuits. Other circuits may provide information via the input/output interface of the processor module 714 to the OS and/or application programs executed by the processor module 714. Persons having ordinary skill in the art should have common knowledge of computer organization and architecture which enabling them to understand that the flows and methods provided by the present application can be realized by the circuits and the instructions.

The interface module 715 may include kinds of serial or parallel bus, such as universal serial bus (USB), I²C, peripheral component interconnect (PCI), PCI-Express, IEEE 1394 and other industrial standard input/output interface. The touch sensitive processing apparatus 710 connects to the host 740 via the interface module 715.

The touch system 700 may comprise one or more styli 730 and/or touch board erasers 735. The stylus 730 and touch board eraser 735 may be transmitters which emit electrical signals. The transmitters may include active transmitter which actively emits electrical signals or passive transmitters which emit electrical signals in response to external electrical signals. The stylus 730 and touch board eraser 735 may comprise one or more electrodes which is configured to receive electrical signals from the touch screen 300, 400 or 600 synchronously or asynchronously, or to transmit electrical signals to the touch screen 300, 400 or 600 synchronously or asynchronously. The electrical signals may be modulated according to one or more of the aforementioned modulation methods.

The stylus 730 or touch board eraser 735 may be conductor which is configured to transmit driving signals or to be grounded via user's hand or body. The stylus 730 or touch board eraser 735 may be physically or wirelessly connected to an I/O interface 741 of the host 740 or any other interfacing circuits of the I/O interface 741.

The touch sensitive processing apparatus 710 may detect one or more external objects such as fingers, palms or passive styli 730 or touch board erasers 735, or active styli 730 or touch board erasers 735 emitting electrical signals via the touch screen 300, 400 or 600. The touch sensitive processing apparatus 710 may utilize mutual-capacitance sensing or self-capacitance sensing to detect external conductive objects. The styli 730 or touch board erasers 735 and touch sensitive processing apparatus 710 may use the aforementioned modulation and demodulation methods to transmit message via the electrical signals. The touch sensitive processing apparatus 710 may detect one or more positions where the styli 730 or touch board erasers 735 touch or approach the touch screen 300, 400, or 600, status or sensors (pressure sensor or button) onboard the stylus 730 or touch board eraser 735, orientation angle or inclination angle of the stylus 730 or touch board eraser 735 with respect to the touch screen 300, 400 or 600 and etc. according to the electrical signals.

The host 740 is a main apparatus for controlling the touch system 700. It may comprise an input/output interface module 741 for connecting the interface module 715, a central processing unit (CPU) module 742, a graphics processor module 743, a memory module 744 connects to the CPU module 742, a network interface module 745 and a storage 746 module connect to the input/output interface module 741.

The storage module 746 comprises non-volatile memory. Common examples are hard disks, electronic erasable rewritable read only memory (EEPROM), or flash memory. The storage module 746 may store normal operating system and application programs executable under the operating system. The network interface module 745 may comprise wired or wireless hardware network interface. The network interface module 745 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 742 may directly or indirectly connects to the input/output interface module 741, the graphics processor module 743, the memory module 744, the network interface module 745 and the storage module 746. The CPU module 742 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 742 is able to control other circuits of the touch system 100.

The optional graphics processor (GPU) module 743 is usually configured to handle computations with respect to graphics outputs. The graphics processor module 743 may connect to the touch screen 300, 400 or 600 for controlling outputs of the touch screen 300, 400 or 600. In some applications, the host 740 may have the CPU module 742 execute the computations with respect to graphics outputs, without dedicated handling of the graphics processor module 743.

The host 740 may comprise components or apparatus not shown in FIG. 7, for example, audio input/output interface, keyboard input interface, mouse input interface, track-ball input interface and/or any other hardware circuits. Persons having ordinary skill in the art should have common knowledge of computer organization and architecture. They can understand the touch system 700 disclosed by the present application is exemplary. Parts regarding to the inventive feature provided by the present application should be referred to the specification and the claim.

Figure 8:
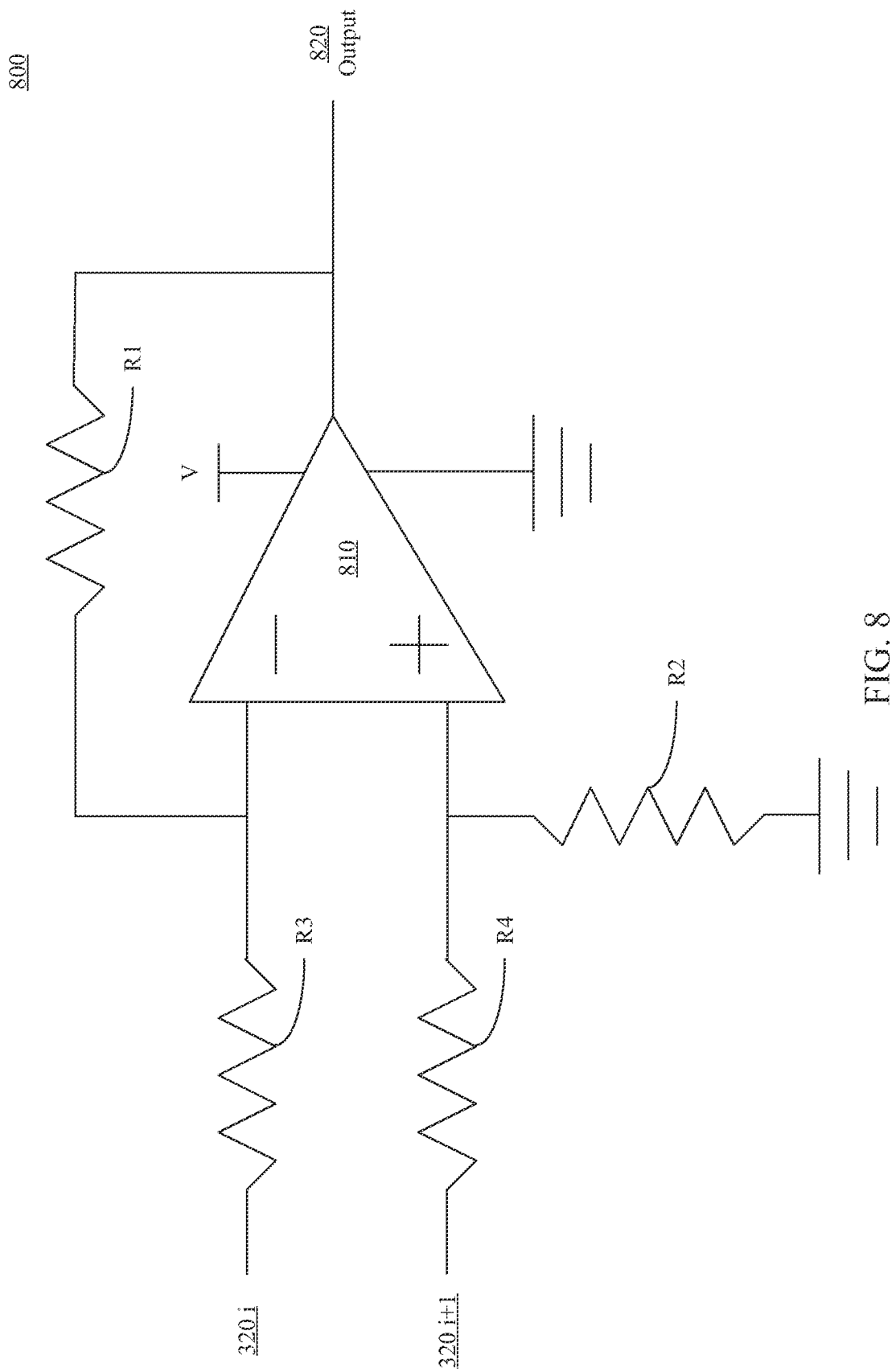
FIG. 8 is a diagram depicts a difference value circuit 800 according to an embodiment of the present invention.

Please refer to FIG. 8, which is a diagram depicts a difference value circuit 800 according to an embodiment of the present invention. The difference value circuit 800 is a part of the sensing circuit module 713. The difference value circuit 800 may comprise an operational amplifier and four resistors R1~R4. Via arrangement of the interconnection network module 711, two inputs of the difference value circuit 800 are connected to two adjacent second electrodes 300$i$ and 300$i$+1 and it produces an output value 820 to other components of the sensing circuit module 713 such as sampler, ADC (analog-to-digital converter) and etc.

When the two adjacent second electrodes do not reflect any capacitance changes caused by external objects, the output value 820 of the operational amplifier 810 is zero, i.e., a difference value of two sensing values corresponding to the two second electrodes is none. When capacitance changes caused by external objects applied to the two adjacent second electrodes, the output value 820 of the operational amplifier 810 would not be zero. The sensing circuit module 713 may calculate a relative position of the external objects regarding to the corresponding second electrodes according to the output value.

Figure 9:
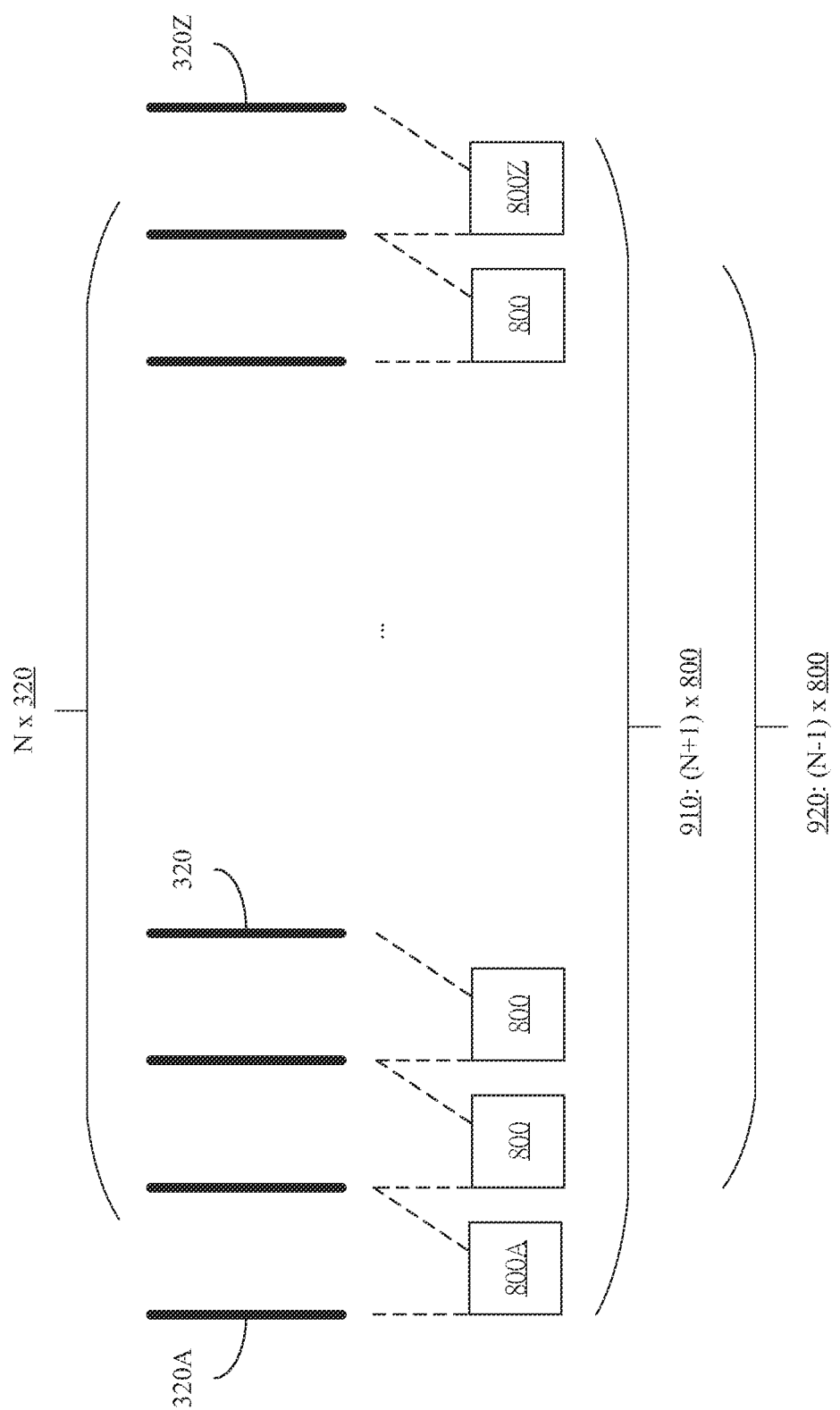
FIG. 9 is a diagram illustrates a part of the sensing circuit module 713 in accordance with an embodiment of the present application.

Please refer to FIG. 9, which is a diagram illustrates a part of the sensing circuit module 713 in accordance with an embodiment of the present application. In the embodiment as shown in FIG. 9, the sensing circuit module 713 comprises multiple difference value circuits 800. Each of the difference value circuits 800 connects to two adjacent second electrodes, e.g., the second electrodes 320 as shown in FIGS. 3 and 4 or the second electrodes 620 as shown in FIG. 6. The first input of the first difference value circuit 800A is connected to the $1^{st}$ second electrode 320A. The second input of the last difference value circuit 800Z is connected to the last second electrode 320Z. When there are N+2 second electrodes in the touch screen 300, 400 or 600, there would be (N+1) difference value circuits 800 in the sensing circuit module 713 for forming a first group of differential value circuits 910. The output values 820 of each difference value circuits 800 may form a one-dimensional first sensing array with (N+1) elements, where N is a positive integer larger than 2.

When implementing the above mutual-capacitance sensing, multiple one-dimensional first sensing arrays can be used to form a two-dimensional first sensing array which is further used to detect external objects hovering on or touching the touch screen.

In some embodiments, N second difference value circuits can be further connected to the outputs of the N+1 difference value circuits 800. Inputs of each of the second difference circuits connect to two adjacent difference value circuits 800. Hence, one-dimensional dual difference value sensing array can be outputted from the N second difference value circuits. Person having ordinary skill in the art can understand that a two-dimensional dual difference value sensing array can be formed according to multiple one-dimensional dual difference value sensing arrays. Moreover, the two-dimensional dual difference value sensing array can be used to detect external objects approximating or touching the touch screen.

In some embodiments, the second dual difference value circuits may include arithmetic and logic operation circuits to perform arithmetic operations without including a differential circuit. Each of the second dual difference value circuits are corresponding to sensing results of three second electrodes. In some alternative embodiments, functions of all the second dual difference value circuits may be carried out by arithmetic and logic operation circuits.

However, in some circumstances, the $1^{st}$ and the last second electrodes are prone to be interfered electromagnetically so that the output values of the first difference value circuit 800A or the last difference value circuit 800Z is disrupted. For examples, fingers of a user hold the frame, or a stylus is put besides the frame. These external objects consistently interfere electromagnetically the $1^{st}$ second electrode and/or the last second electrode. When this happens, a one-dimension second sensing array with (N−1) elements outputted by a second group of difference value circuits 920 may be used alternatively. The one-dimensional second sensing array is the one-dimensional first sensing array without the first and the last elements.

Similarly, in aforementioned mutual-capacitance sensing, multiple one-dimensional second sensing arrays can be used to form a two-dimensional second sensing array which is further used to detect external objects hovering on or touching the touch screen. Because elements of the two-dimensional second sensing array are less than elements of the two-dimensional first sensing array, it has a smaller range of detecting external objects.

Similarly, in the mutual capacitance sensing, a one-dimensional dual difference value second sensing array with N−2 elements can be generated from one dimensional second sensing array with N−1 elements. Person having ordinary skill art can understand that a two-dimensional dual difference value second sensing array can be formed according to multiple one-dimensional dual difference value second sensing arrays. Moreover, the two-dimensional dual difference value second sensing array can be used to detect external objects approximating or touching the touch screen.

When being interfered, the output values of the first difference value circuit 800A and the last difference value circuit 800Z are usually saturated. In other words, they reach the upper bound or the lower bound of the output values. The sensing circuit module 713 is unable to determine what exact the output value is originally. However, the present application may alternatively use outputs of the second group of the difference value circuits 920 for gathering results of the normal area 110 in the middle of the touch screen. It does not need to abandon detection to the entire touch screen because of the 1$^{st}$ second electrode and/or the last second electrode being interfered. It also avoids the detecting errors caused by referencing to the interfered sensing results.

In some embodiments, when it is required to detect hovering or touching gestures originated from the frame to the middle of the touch screen, the touch sensitive processing apparatus may use output results of the first group of the difference value circuits 910 in order to detect external objects hovering or touching in the peripheral area 120 as shown in FIG. 1.

In some embodiments, in order to increase accuracy of detecting hovering and touching position or in order to alleviating surrounding electromagnetic interference, the touch sensitive processing apparatus may use output results of the second group of the difference value circuits 920.

In some embodiments, gain values of the operational amplifiers in the 1$^{st}$ difference value circuit 800A and the last difference value circuit 800Z may be adjusted while gain values of the rest difference value circuits 800 are maintained. In other words, the gain values of the 1$^{st}$ difference value circuit 800A and the last difference value circuit 800Z are different to the gain values of the rest difference value circuits 800 for accommodating environmental electromagnetic interferences. Calibration process may be performed when the touch system 100 is manufactured or started in order to calculate the gain values of the 1$^{st}$ difference value circuit 800A and the last difference value circuit 800Z.

Figure 10:
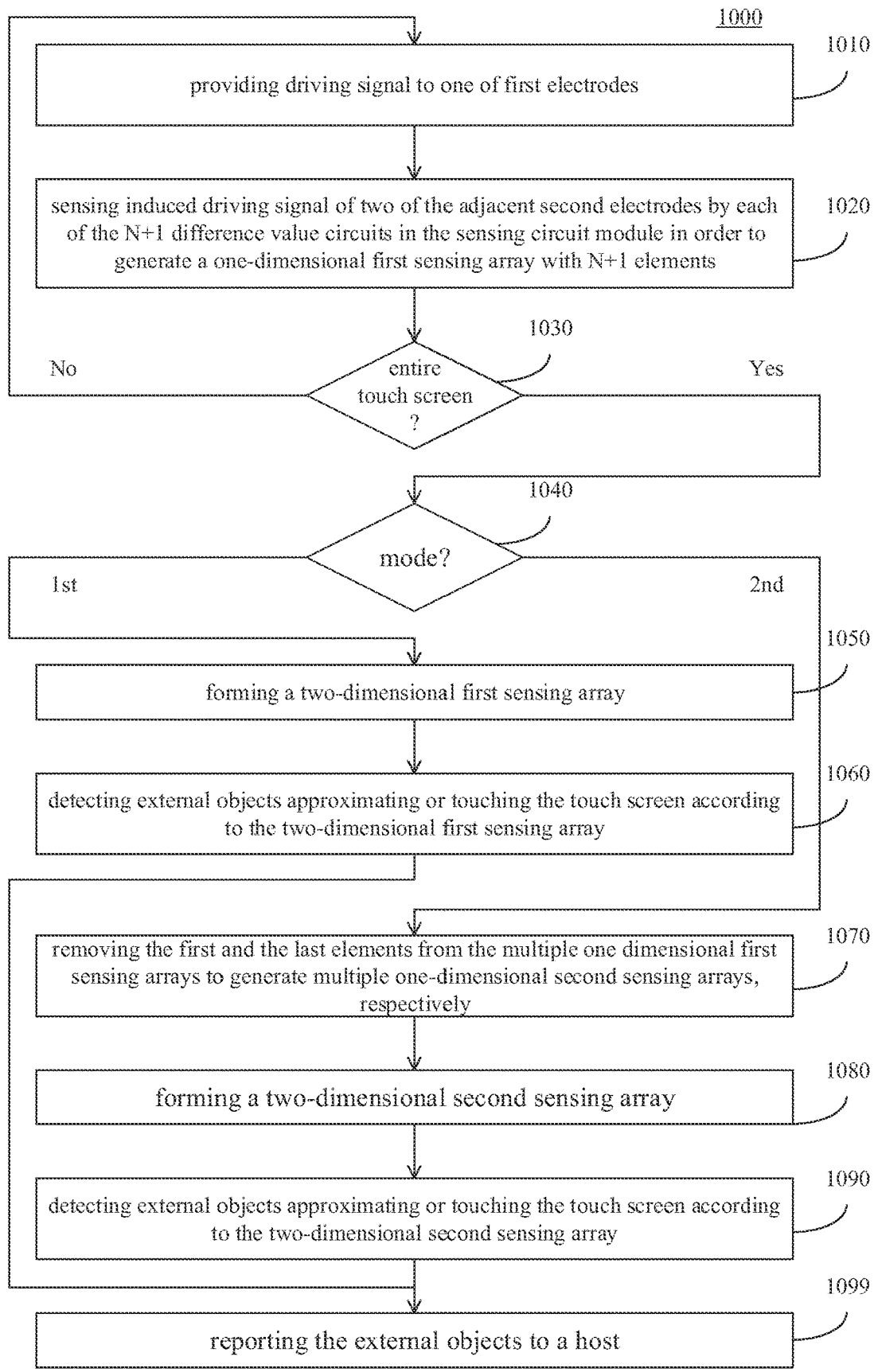
FIG. 10 illustrates a touch sensitive processing method 1000 in accordance with an embodiment of the present application.

Please refer to FIG. 10, which illustrates a touch sensitive processing method 1000 in accordance with an embodiment of the present application. The touch sensitive processing method 1000 may be applicable to the touch system 700 as shown in FIG. 7, especially to the touch sensitive processing apparatus 710. In one embodiment, the processor module 714 may execute instructions and data stored in non-volatile memory to realize the touch sensitive processing method 1000. If there is no causal relation between two steps, the present application does not limit execution order of the two steps. The touch sensitive processing method 1000 may begins at step 1010 in order to detect on the whole touch screen 300, 400 or 600.

Step 1010: providing driving signal to one of first electrodes.

Step 1020: while the step 1010 is being performed, sensing induced driving signal of two of the adjacent second electrodes by each of the N+1 difference value circuits in the sensing circuit module in order to generate a one-dimensional first sensing array with N+1 elements.

Step 1030: determining whether all the first electrodes of the touch screen are being provided with the driving signal. When there is at least one first electrode not being provided with the driving signal, the flow returns to step 1010. When all the first electrodes of the touch screen are being provided with the driving signal, the flow proceeds to step 1040.

Step 1040: determining which mode it is in currently. When it is in a first mode, the flow proceeds to step 1050. When it is in a second mode, the flow proceeds to step 1070.

Step 1050: forming a two-dimensional first sensing array based on all of the one-dimensional first sensing arrays according to an order that the first electrodes being provided with the driving signal.

Step 1060: detecting external objects approximating or touching the touch screen according to the two-dimensional first sensing array.

Step 1070: removing the first and the last elements from the multiple one dimensional first sensing arrays to generate multiple one-dimensional second sensing arrays, respectively.

Step 1080: forming a two-dimensional second sensing array based on all of the one-dimensional second sensing arrays according to an order that the first electrodes being provided with the driving signal.

Step 1090: detecting external objects approximating or touching the touch screen according to the two-dimensional second sensing array.

Step 1099: reporting the external objects detected at step 1060 or step 1090 to a host.

In one embodiment, the step 1020 may further comprises performing difference value operations on the adjacent elements of the one-dimensional first sensing array to get a new one dimensional first sensing array.

According to one embodiment of the present application, a touch screen which is provided comprising: a display; multiple first electrodes in parallel to a first axis and multiple second electrodes in parallel to a second axis, wherein the first and the second electrodes are overlapped with the display; and an opaque and non-conductive frame which surrounds and overlaps on top of edges of the display, wherein the first axis is perpendicular to the second axis, the first electrodes intersect with the second electrodes, a distance between center lines of any two adjacent second electrodes is a second pitch, a distance in the first axis between a center line of the first one of the second electrodes and a second edge of the frame in parallel to the second axis is less than or equals to a quarter of the second pitch, a distance in the first axis between a center line of the last one of the second electrodes and a fourth edge of the frame in parallel to the second axis is less than or equals to a quarter of the second pitch.

Preferably, in order to fit the touch electrodes into a double layer structure, wherein the first electrodes and the second electrodes are deposited in different layers, wherein each of the first electrodes are rectangular and each of the second electrodes are rectangular.

Preferably, in order to fit the touch electrodes into a single layer structure, wherein the first and the second electrodes are deposited into a same layer, each of the first electrodes comprises multiple connected first rectangular conductive plates, each of the second electrodes comprises multiple connected second rectangular conductive plates, the first or the second rectangular conductive plates are connected by bridging.

Preferably, in order to increase detectability in the peripheral area of the touch screen, wherein the distance in the first axis between the center line of the first one of the second electrodes and the second edge of the frame in parallel to the second axis is less than or equals to a half width of the second electrode, the distance in the first axis between the center line of the last one of the second electrodes and the fourth edge of the frame in parallel to the second axis is less than or equals to a half width of the second electrode.

Preferably, in order to increase detectability in the peripheral area of the touch screen, wherein the first and the last second electrodes are deposited in between the frame and the display.

Preferably, in order to increase detectability in the peripheral area of the touch screen, wherein a distance between center lines of any two adjacent first electrodes is a first pitch, a distance in the second axis between a center line of the first one of the first electrodes and a first edge of the frame in parallel to the first axis is less than or equals to a quarter of the first pitch, a distance in the second axis between a center line of the last one of the first electrodes and a third edge of the frame in parallel to the first axis is less than or equals to a quarter of the first pitch.

Preferably, in order to increase detectability in the peripheral area of the touch screen, wherein the distance in the second axis between the center line of the first one of the first electrodes and the first edge of the frame in parallel to the first axis is less than or equals to a half width of the first electrode, the distance in the second axis between the center line of the last one of the first electrodes and the third edge of the frame in parallel to the first axis is less than or equals to a half width of the first electrode.

Preferably, in order to increase detectability in the peripheral area of the touch screen, wherein the first and the last first electrodes are deposited in between the frame and the display.

Preferably, in order to design conveniently, a width of the first electrode is identical to a width of the second electrode.

Preferably, in order to adopt to fingertip size of normal people, wherein the second pitch is 10 mm, a width of the second electrode is 2 mm.

According to an embodiment of the present application, a touch sensitive processing apparatus is provided for controlling the touch screen, wherein there are N+2 second electrodes, where N is a natural number larger than 2, wherein the touch sensitive processing apparatus comprising: a driving circuit for providing driving signal to the multiple first electrodes in turns; a sensing circuit, including N+1 difference value circuits, wherein while the driving signal is being provided by the driving circuit, each of the difference value circuits is configured for sensing the induced driving signal of two adjacent second electrodes in order to generate a one-dimensional first sensing array with N+1 elements; and a processor module, connecting to the driving circuit and the sensing circuit, configured for receiving multiple of the one-dimensional first sensing arrays in turns to form a two-dimensional first sensing array; and detecting external objects approximating or touching the touch screen according to the second-dimensional first sensing array.

Preferably, in order to alleviating electromagnetic interference around the frame, wherein the processor module is further configured for: removing the first and the last elements of the multiple one-dimensional first sensing arrays to generate multiple two-dimensional second sensing arrays, respectively; forming a two-dimensional second sensing array based on the multiple two-dimensional second sensing arrays; and detecting external objects approximating or touching the touch screen according to the two-dimensional second sensing array.

Preferably, in order to detect external objects moving from the frame into the touch screen, when in a first mode, the touch sensitive processing apparatus is further configured for reporting the external objects detected according to the two-dimensional first sensing array to a host, wherein the first mode is corresponding to detecting the external objects moving from the frame into the display.

Preferably, in order to detect external objects hovering or touching a non-peripheral area of the touch screen, wherein in a second mode, the touch sensitive processing is further configured for reporting the external objected detected according to the two-dimensional second sensing array to a host, wherein the second mode is corresponding to detecting the external objects hovering or touching the touch screen in a non-peripheral area.

Preferably, in order to deal with a phenomenon of electromagnetic interference to the peripheral area of the touch screen, wherein gains of the first and the last of the difference value circuits are different to gains of rest of the difference value circuits.

According to an embodiment of the present application, a touch sensitive processing method is provided for controlling the touch screen, wherein there are N+2 second electrodes, where N is a natural number larger than 2, wherein the touch sensitive processing method comprising: providing driving signal to the multiple first electrodes in turns; while the driving signal is being provided by the driving circuit, sensing, by each of N+1 difference value circuits, the induced driving signal of two adjacent second electrodes in order to generate a one-dimensional first sensing array with N+1 elements; receiving multiple of the one-dimensional first sensing arrays in turns to form a two-dimensional first sensing array; and detecting external objects approximating or touching the touch screen according to the second-dimensional first sensing array.

Preferably, in order to alleviating electromagnetic interference around the frame, wherein the touch sensitive processing method further comprises: removing the first and the last elements of the multiple second sensing arrays, respectively; forming a two-dimensional second sensing array based on the multiple two-dimensional second sensing arrays; and detecting external objects approximating or touching the touch screen according to the two-dimensional second sensing array.

Preferably, in order to detect external objects moving from the frame into the touch screen, wherein the touch sensitive processing method further comprises: when in a first mode, reporting the external objects detected according to the two-dimensional first sensing array to a host, wherein the first mode is corresponding to detecting the external objects moving from the frame into the display.

Preferably, in order to detect external objects hovering or touching a non-peripheral area of the touch screen, wherein the touch sensitive processing method further comprises: wherein in a second mode, reporting the external objected detected according to the two-dimensional second sensing array to a host, wherein the second mode is corresponding to detecting the external objects hovering or touching the touch screen in a non-peripheral area.

Preferably, in order to deal with a phenomenon of electromagnetic interference to the peripheral area of the touch screen, wherein gains of the first and the last of the difference value circuits are different to gains of rest of the difference value circuits.

According to an embodiment of the present application, a touch system provided comprising the touch sensitive processing apparatus and the According to an embodiment of the present application, a touch system provided comprising the touch sensitive processing apparatus, the touch screen and the host.

The present application provides design improvements of touch electrodes in the peripheral area of the touch screen which can reduce errors of detecting external object hovering or touching the peripheral area of the touch screen. The present application further provides touch sensitive processing apparatus and method thereof, which reduce electromagnetic interferences to the peripheral area of the touch screen by using difference value circuits.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing apparatus for controlling a touch screen, wherein the touch screen comprising a display; multiple first electrodes in parallel to a first axis and multiple second electrodes in parallel to a second axis, wherein the first and the second electrodes are overlapped with the display; and an opaque and non-conductive frame which surrounds and overlaps on top of edges of the display, the first axis is perpendicular to the second axis, the first electrodes intersect with the second electrodes, a distance between center lines of any two adjacent second electrodes is a second pitch, a distance in the first axis between a center line of the first one of the second electrodes and a second edge of the frame in parallel to the second axis is less than or equals to a quarter of the second pitch, a distance in the first axis between a center line of the last one of the second electrodes and a fourth edge of the frame in parallel to the second axis is less than or equals to a quarter of the second pitch, there are N+2 second electrodes, where N is a natural number larger than 2, wherein the touch sensitive processing apparatus comprising:
 a driving circuit for providing driving signal to the multiple first electrodes in turns;
 a sensing circuit, including N+1 difference value circuits, wherein while the driving signal is being provided by the driving circuit, each of the difference value circuits is configured for sensing the induced driving signal of two adjacent second electrodes in order to generate a one-dimensional first sensing array with N+1 elements; and
 a processor module, connecting to the driving circuit and the sensing circuit, configured for
 receiving multiple of the one-dimensional first sensing arrays in turns to form a two-dimensional first sensing array; and
 detecting external objects approximating or touching the touch screen according to the second-dimensional first sensing array.

2. The touch sensitive processing apparatus of claim 1, wherein the processor module is further configured for:
 removing the first and the last elements of the multiple one-dimensional first sensing arrays to generate multiple two-dimensional second sensing arrays, respectively;
 forming a two-dimensional second sensing array based on the multiple two-dimensional second sensing arrays; and
 detecting external objects approximating or touching the touch screen according to the two-dimensional second sensing array.

3. The touch sensitive processing apparatus of claim 1, wherein when in a first mode, the touch sensitive processing apparatus is further configured for reporting the external objects detected according to the two-dimensional first sensing array to a host, wherein the first mode is corresponding to detecting the external objects moving from the frame into the display.

4. The touch sensitive processing apparatus of claim 2, wherein in a second mode, the touch sensitive processing is further configured for reporting the external objected detected according to the two-dimensional second sensing array to a host, wherein the second mode is corresponding to detecting the external objects hovering or touching the touch screen in a non-peripheral area.

5. The touch sensitive processing apparatus of claim 1, wherein gains of the first and the last of the difference value circuits are different to gains of rest of the difference value circuits.

6. A touch sensitive processing method for controlling a touch screen, wherein the touch screen comprising a display; multiple first electrodes in parallel to a first axis and multiple second electrodes in parallel to a second axis, wherein the first and the second electrodes are overlapped with the display; and an opaque and non-conductive frame which surrounds and overlaps on top of edges of the display, the first axis is perpendicular to the second axis, the first electrodes intersect with the second electrodes, a distance between center lines of any two adjacent second electrodes is a second pitch, a distance in the first axis between a center line of the first one of the second electrodes and a second edge of the frame in parallel to the second axis is less than or equals to a quarter of the second pitch, a distance in the first axis between a center line of the last one of the second electrodes and a fourth edge of the frame in parallel to the second axis is less than or equals to a quarter of the second pitch, there are N+2 second electrodes, where N is a natural number larger than 2, wherein the touch sensitive processing method comprising:
 providing driving signal to the multiple first electrodes in turns;
 while the driving signal is being provided by the driving circuit, sensing, by each of N+1 difference value circuits, the induced driving signal of two adjacent second electrodes in order to generate a one-dimensional first sensing array with N+1 elements;
 receiving multiple of the one-dimensional first sensing arrays in turns to form a two-dimensional first sensing array; and
 detecting external objects approximating or touching the touch screen according to the second-dimensional first sensing array.

7. The touch sensitive processing method of claim 6, further comprises:
 removing the first and the last elements of the multiple one-dimensional first sensing arrays to generate multiple two-dimensional second sensing arrays, respectively;
 forming a two-dimensional second sensing array based on the multiple two-dimensional second sensing arrays; and
 detecting external objects approximating or touching the touch screen according to the two-dimensional second sensing array.

8. The touch sensitive processing method of claim 6, further comprises: when in a first mode, reporting the external objects detected according to the two-dimensional first sensing array to a host, wherein the first mode is corresponding to detecting the external objects moving from the frame into the display.

9. The touch sensitive processing method of claim 7, further comprises: wherein in a second mode, reporting the external objected detected according to the two-dimensional second sensing array to a host, wherein the second mode is corresponding to detecting the external objects hovering or touching the touch screen in a non-peripheral area.

10. The touch sensitive processing method of claim 6, wherein gains of the first and the last of the difference value circuits are different to gains of rest of the difference value circuits.

\* \* \* \* \*